(12) United States Patent
Boissy

(10) Patent No.: US 11,952,256 B2
(45) Date of Patent: Apr. 9, 2024

(54) BEVERAGE DISTRIBUTION ASSEMBLY

(71) Applicant: Ripe Bar Juice LLC, Wallingford, CT (US)

(72) Inventor: Michel Boissy, New Haven, CT (US)

(73) Assignee: Ripe Bar Juice LLC, Wallingford, CT (US)

( * ) Notice: Subject to any disclaimer, the term of this patent is extended or adjusted under 35 U.S.C. 154(b) by 965 days.

(21) Appl. No.: 16/604,178

(22) PCT Filed: Apr. 9, 2018

(86) PCT No.: PCT/US2018/026651
§ 371 (c)(1),
(2) Date: Oct. 10, 2019

(87) PCT Pub. No.: WO2018/191136
PCT Pub. Date: Oct. 18, 2018

(65) Prior Publication Data
US 2020/0131017 A1 Apr. 30, 2020

Related U.S. Application Data

(63) Continuation of application No. 15/484,760, filed on Apr. 11, 2017, now abandoned, which is a
(Continued)

(51) Int. Cl.
*B67D 1/00* (2006.01)
*A23L 2/42* (2006.01)
(Continued)

(52) U.S. Cl.
CPC ............... *B67D 1/0016* (2013.01); *A23L 2/42* (2013.01); *A23L 3/0155* (2013.01); *B01F 23/45* (2022.01);
(Continued)

(58) Field of Classification Search
CPC .. B67D 1/0016; B67D 1/0801; B67D 1/1204; B67D 1/129; B67D 2001/0827;
(Continued)

(56) References Cited

U.S. PATENT DOCUMENTS

| 1,944,811 A | 1/1934 | Rogers, Jr. |
| 3,830,405 A | 8/1974 | Jaeger |

(Continued)

FOREIGN PATENT DOCUMENTS

WO  WO 2017/007896 A1  1/2017

OTHER PUBLICATIONS

International Searching Authority Search Report for PCT/US16/41276 dated Dec. 2, 2016.
(Continued)

*Primary Examiner* — Jeremy Carroll
(74) *Attorney, Agent, or Firm* — Kintner IP, LLC; Mary Frances Ludwig

(57) ABSTRACT

A system for providing a pre-mixed beverage from a distribution device includes a first container including a first consumable material and a second container including a second consumable material. A mixing block is arranged in fluid communication with the first container, the second container, and the distribution device such that a mixture of the first consumable material and the second consumable material is formed within the mixing block. At least one pump is operably coupled to first container, the second container, and the distribution device.

9 Claims, 17 Drawing Sheets

Related U.S. Application Data continuation-in-part of application No. 15/081,188, filed on Mar. 25, 2016, now Pat. No. 9,849,429.

(60) Provisional application No. 62/189,470, filed on Jul. 7, 2015.

(51) Int. Cl.

| | | |
|---|---|---|
| *A23L 3/015* | (2006.01) | |
| *B01F 23/45* | (2022.01) | |
| *B01F 25/312* | (2022.01) | |
| *B01F 101/16* | (2022.01) | |
| *B65D 47/12* | (2006.01) | |
| *B65D 47/28* | (2006.01) | |
| *B65D 51/16* | (2006.01) | |
| *B65D 75/58* | (2006.01) | |
| *B65D 85/72* | (2006.01) | |
| *B67D 1/08* | (2006.01) | |
| *B67D 1/12* | (2006.01) | |

(52) U.S. Cl.
CPC ............ *B01F 25/312* (2022.01); *B65D 47/12* (2013.01); *B65D 47/121* (2013.01); *B65D 47/283* (2013.01); *B65D 51/1611* (2013.01); *B65D 75/5877* (2013.01); *B65D 85/72* (2013.01); *B67D 1/0046* (2013.01); *B67D 1/0801* (2013.01); *B67D 1/1204* (2013.01); *B67D 1/129* (2013.01); *A23V 2002/00* (2013.01); *B01F 2101/16* (2022.01); *B67D 2001/0827* (2013.01)

(58) Field of Classification Search
CPC ...... B01F 23/25; B01F 2101/16; B65D 47/12; B65D 47/283
See application file for complete search history.

(56) References Cited

U.S. PATENT DOCUMENTS

| | | | |
|---|---|---|---|
| 4,057,223 A | 11/1977 | Rosenberger | |
| 5,232,726 A | 8/1993 | Clark et al. | |
| 5,664,940 A | 9/1997 | Du | |
| 6,183,800 B1 | 2/2001 | van Straten et al. | |
| D489,603 S | 5/2004 | Berman | |
| 6,824,019 B2* | 11/2004 | Voisin | A23L 3/0155 |
| | | | 222/509 |
| 2002/0043071 A1* | 4/2002 | Frank | A23G 9/20 |
| | | | 62/135 |
| 2002/0066714 A1 | 6/2002 | Mainquist et al. | |
| 2006/0054614 A1* | 3/2006 | Baxter | A23G 9/228 |
| | | | 219/400 |
| 2009/0095369 A1 | 4/2009 | Murray | |
| 2009/0283553 A1 | 11/2009 | Hoss et al. | |
| 2010/0224649 A1 | 9/2010 | Hoover | |
| 2010/0308078 A1* | 12/2010 | Saveliev | B67D 1/106 |
| | | | 222/105 |
| 2011/0017776 A1* | 1/2011 | Metropulos | B67D 1/0041 |
| | | | 222/129.1 |
| 2012/0104024 A1 | 5/2012 | Anselmino et al. | |
| 2012/0199013 A1 | 8/2012 | Gutierrez | |
| 2012/0298693 A1 | 11/2012 | Jersey et al. | |
| 2013/0056493 A1* | 3/2013 | Newton | B67D 1/0016 |
| | | | 222/145.5 |
| 2013/0078339 A1* | 3/2013 | Trahan | A23L 3/358 |
| | | | 426/106 |
| 2013/0266699 A1 | 10/2013 | Middis et al. | |
| 2014/0226922 A1 | 8/2014 | Bons et al. | |
| 2014/0227405 A1* | 8/2014 | Beland | A23G 3/48 |
| | | | 426/240 |
| 2014/0314918 A1* | 10/2014 | Wettlaufer | A47J 19/02 |
| | | | 426/115 |
| 2016/0130127 A1 | 5/2016 | Copenhaver et al. | |
| 2017/0006899 A1 | 1/2017 | Boissy | |
| 2017/0006900 A1 | 1/2017 | Boissy | |
| 2018/0371386 A1* | 12/2018 | Resch | C12G 3/06 |

OTHER PUBLICATIONS

Restriction Requirement for U.S. Appl. No. 15/081,188 dated Jul. 8, 2016.
Scholle Packaging, Scholle Truefill 900 Series, 900 Fresh & 900 ESL Fillers, last viewed Jan. 26, 2017.
Scholle Packaging, Scholle Surefill Bag-in-Box Filler, last viewed Jan. 26, 2017.
United States Patent & Trademark Office Non Final Office Action for U.S. Appl. No. 15/081,188 dated Oct. 26, 2016.
International Searching Authority Written Opinion for PCT/US16/41276 dated Dec. 2, 2016.
United States Patent & Trademark Office Final Office Action for U.S. Appl. No. 15/081,188 dated Apr. 28, 2017.
International Searching Authority Invitiation to Pay Additional Fees for PCT/US16/41276 dated Sep. 20, 2016.
Written Opinion of the International Search Authority for PCT/US2018/026651 dated Jul. 30, 2018.
International Search Report for PCT/US2018/026651 dated Jul. 30, 2018.
Soda Dispenser Depot, 4 Flojet G55 Series Pumps with BIB Hose and BIB Connects Mounted on Pump Brackets, http://www.sodadispenserdepot.com/pics/flojet11151.html last viewed Aug. 13, 2018.
Specifications for Flojet G55 Series, High Performing G55 Series $CO_2$ Operated Bag-In-Box Pump last viewed Aug. 13, 2018.
Installation, Operation and Maintenance Manual For G70 / G71 Series Air Driven Diaphragm Pumps dated Jun. 2015.
Hamilton Beach Commerical, COT2000 Series PrimePour™ Cocktails on Tap dated Jun. 2015.
Restaurant Services Inc. TenderPOUR®, http://rsidrivesroi.com/portfolio/tenderpour-system/, and https://web.archive.org/web/20160327123022/http://rsidrivesroi.com/portfolio/tenderpour-system/ dated Mar. 27, 2016 and TenderPour™, https://web.archive.org/web/20160129211615/http://rsidrivesroi.com/ dated Jan. 29, 2016.
Restaurant Services Inc. TenderPOUR® Component Pricing Options last viewed Aug. 17, 2018.
USPTO TenderPOUR Trademark Registration last viewed Aug. 17, 2018.
USPTO TenderPOUR Trademark Registration details last viewed Aug. 17, 2018.
Innovative Dispense Solutions, Cocktail on Tap Dispenser Weekly Cleaning Guide—QCD & Bottle Reserves, www.innovativedispensing.com dated Nov. 8, 2012.
Innovative Dispense Solutions, Cocktail on Tap Dispenser Operational/Set Up Guide—QCD & Bottle Reserves, www.innovativedispensing.com dated Nov. 8, 2012.
En.Wikipedia.org, Reservoir, https://en.wikipedia.org/wiki/Reservoir last viewed Sep. 26, 2018.
California Beverage Technology Cocktail Mixing Station Photograph taken Mar. 4, 2013.
Flojet, Model N5000 $CO_2$ Operated Bag-in-Box Pump dated 2001.
En.Wikipedia.org, Pressure Sensor, https://en.wikipedia.org/wiki/Pressure_sensor, last viewed Sep. 24, 2019.

* cited by examiner

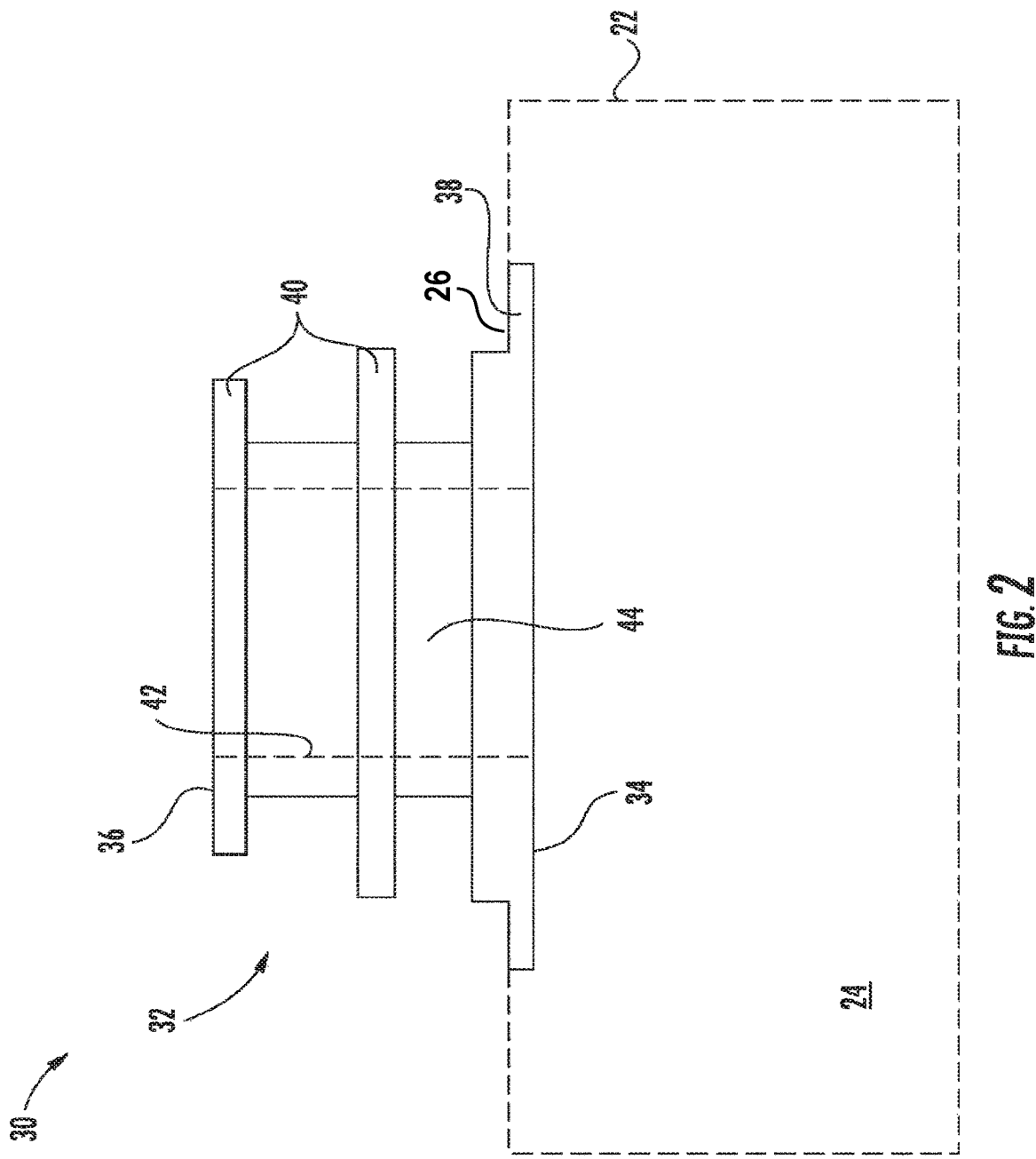

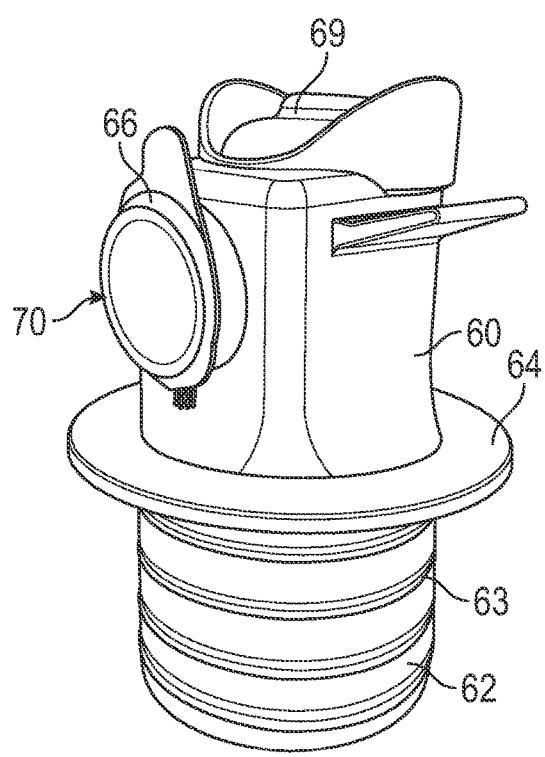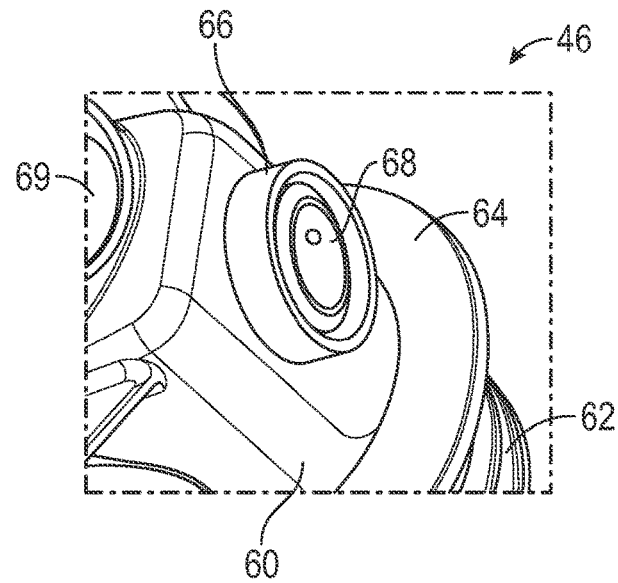
FIG. 6
FIG. 7

BEVERAGE DISTRIBUTION ASSEMBLY

TECHNICAL FIELD

The inventions described herein are in the field of methods and systems for beverage dispensing.

BACKGROUND ART

The subject matter disclosed herein generally relates to the preparation of cold-pressed fresh juice and other liquids having an extended shelf-life achieved via high pressure processing, and more particularly, to various types of packaging for use with a high pressure process.

Foods and beverages have traditionally been preserved to prolong their shelf-life through the use of chemical and thermal treatment. Pasteurization via thermal treatments has been recognized as an effective means for inactivating microorganisms such as harmful pathogens that may exist in many unprocessed food and beverage products. If left unchecked, these microorganisms can not only cause premature food and beverage spoilage, but can also result in serious health problems, and sometimes death. Although heating food and beverages effectively reduces levels of microorganisms therein, such processing can alter the fresh and natural taste and flavor of the food and beverages while reducing the natural nutrients therein.

Non-thermal processing of foods, such as through a high pressure process ("HPP"), also referred to as high hydrostatic pressure processing or ultra-high pressure processing, is considered a more natural and equally effective means of processing than conventional thermal processing. HPP is used to pasteurize foods at elevated pressures of approximately 2,068 bar to 8,963 bar for a specified temperature and time. The pressure is applied through a pressure medium such as a liquid or a gas. Under these conditions, HPP has been found to be effective in inactivating many pathogenic microorganisms commonly found in foods. As compared to pasteurized liquids, HPP significantly reduces the process temperature and time, which results in foods with improved characteristics such as better retention of freshness, flavor, texture, color, and nutrients.

Due to the increased shelf-life of products processed through HPP, in some applications it may be advantageous to supply packaged products in a large format or in bulk, such as in a variety of sizes up to and exceeding 18.9 liters. This packaging is typically a sealed bottle, bag, or other container formed from a plastic such as polyethylene terephthalate. However, due to the process conditions, such as the high-pressure treatment applied to the packaging and food or liquid, problems can arise. For example, the vacuum generated in the packaging via application of the ultra-high pressure may cause catastrophic damage to the packaging.

BRIEF DESCRIPTION

According to one aspect of the invention, a system for providing a pre-mixed beverage from a distribution device includes a first container including a first consumable material and a second container including a second consumable material. A mixing block is arranged in fluid communication with the first container, the second container, and the distribution device such that a mixture of the first consumable material and the second consumable material is formed within the mixing block. At least one pump is operably coupled to first container, the second container, and the distribution device.

In addition to one or more of the features described above, or as an alternative, in further embodiments said first consumable material has been pascalized via application of a high pressure to said first container.

In addition to one or more of the features described above, or as an alternative, in further embodiments said at least one pump is a diaphragm pump operable via a compressed gas.

In addition to one or more of the features described above, or as an alternative, in further embodiments said system is operable to mix said first consumable material and said second consumable material in real time.

In addition to one or more of the features described above, or as an alternative, in further embodiments said first consumable material is provided to said mixing block at a first flow rate and said second consumable material is provided to said mixing block at a second flow rate.

In addition to one or more of the features described above, or as an alternative, in further embodiments said first flow rate and said second flow rate are different.

In addition to one or more of the features described above, or as an alternative, in further embodiments said first flow rate and said second flow rate are the same.

In addition to one or more of the features described above, or as an alternative, in further embodiments said first flow rate and said second flow rate are independently controllable.

In addition to one or more of the features described above, or as an alternative, in further embodiments at least one of said first flow rate and said second flow rate is controlled by a flow regulation device.

In addition to one or more of the features described above, or as an alternative, in further embodiments said flow regulation device includes a set screw.

In addition to one or more of the features described above, or as an alternative, in further embodiments said first consumable material is a mixer and said second consumable material is an alcohol complementary to said mixer.

In addition to one or more of the features described above, or as an alternative, in further embodiments said container assembly is configured to store a plurality of servings of said first consumable material.

According to another embodiment, a method of dispensing a beverage from a beverage assembly includes operating a distribution device, supplying a first consumable material from a first container in response to operation of said distribution device, supplying a second consumable material from a second container in response to operation of said distribution device, mixing said first consumable material and said second consumable material, and dispensing said mixture of first consumable material and second consumable material from said distribution device.

In addition to one or more of the features described above, or as an alternative, in further embodiments said first consumable material has been pascalized via application of a high pressure to said first container.

In addition to one or more of the features described above, or as an alternative, in further embodiments said first consumable material and said second consumable material are supplied in real time.

In addition to one or more of the features described above, or as an alternative, in further embodiments said first consumable material and said second consumable material are supplied to a mixing block.

In addition to one or more of the features described above, or as an alternative, in further embodiments said first consumable material is supplied to said mixing block at a first flow rate and said second consumable material is supplied to said mixing block at a second flow rate.

In addition to one or more of the features described above, or as an alternative, in further embodiments said first flow rate and said second flow rate are independently controllable.

According to yet another embodiment, a mixing block of a beverage assembly includes a first inlet for receiving a first fluid and a second inlet for receiving a second fluid. An internal cavity is arranged in fluid communication with the first inlet and the second inlet. The first fluid and the second fluid are mixed within the internal cavity. A flow regulation device is configured to control a flow of said first fluid through said first inlet.

In addition to one or more of the features described above, or as an alternative, in further embodiments said flow regulation device is operable to adjust a ratio of said first fluid and the second fluid within the mixture.

In addition to one or more of the features described above, or as an alternative, in further embodiments said mixing block comprises a turbulence enhancing feature associated with at least one of said first inlet, said second inlet, and said internal cavity.

In addition to one or more of the features described above, or as an alternative, in further embodiments at least one of said first inlet and said second inlet is configured to create a pressure drop.

In addition to one or more of the features described above, or as an alternative, in further embodiments said flow regulation device is a set screw.

These and other advantages and features will become more apparent from the following description taken in conjunction with the drawings.

BRIEF DESCRIPTION OF THE DRAWINGS

The subject matter, which is regarded as the present disclosure, is particularly pointed out and distinctly claimed in the claims at the conclusion of the specification. The foregoing and other features, and advantages of the present disclosure are apparent from the following detailed description taken in conjunction with the accompanying drawings in which:

FIG. 2 is a side view of a gland of a portion of the fitment assembly of the container assembly according to an embodiment;

FIG. 6 is a perspective view of a portion of a fitment assembly according to an embodiment;

FIG. 7 is another view of the fitment assembly of FIG. 6 without the sealing element according to an embodiment;

The detailed description explains embodiments of the present disclosure, together with advantages and features, by way of example with reference to the drawings.

DETAILED DESCRIPTION OF THE INVENTION

High pressure pasteurization ("HPP"), also known as high pressure processing and ultra-high pressure processing, is used to preserve foods and beverages by applying an elevated pressure at a specified low temperature for a predetermined period of time. Pressure within a chamber is created by either reducing the pressure chamber volume or by positively displacing the pressurizing material. Under such conditions, HPP has been effective at inactivating microorganisms commonly found in foods and beverages, making them safe for human consumption, similar to pasteurization. Cold, refrigerated food and beverage products that are processed via HPP have a substantially longer shelf life than their raw un-treated counterparts. As compared to conventionally pasteurized foods and beverages, HPP significantly reduces the process temperature and time, thereby resulting in foods and beverages having enhanced characteristics, such as improved retention of freshness, flavor, color, and nutrients for example.

Figure 1:
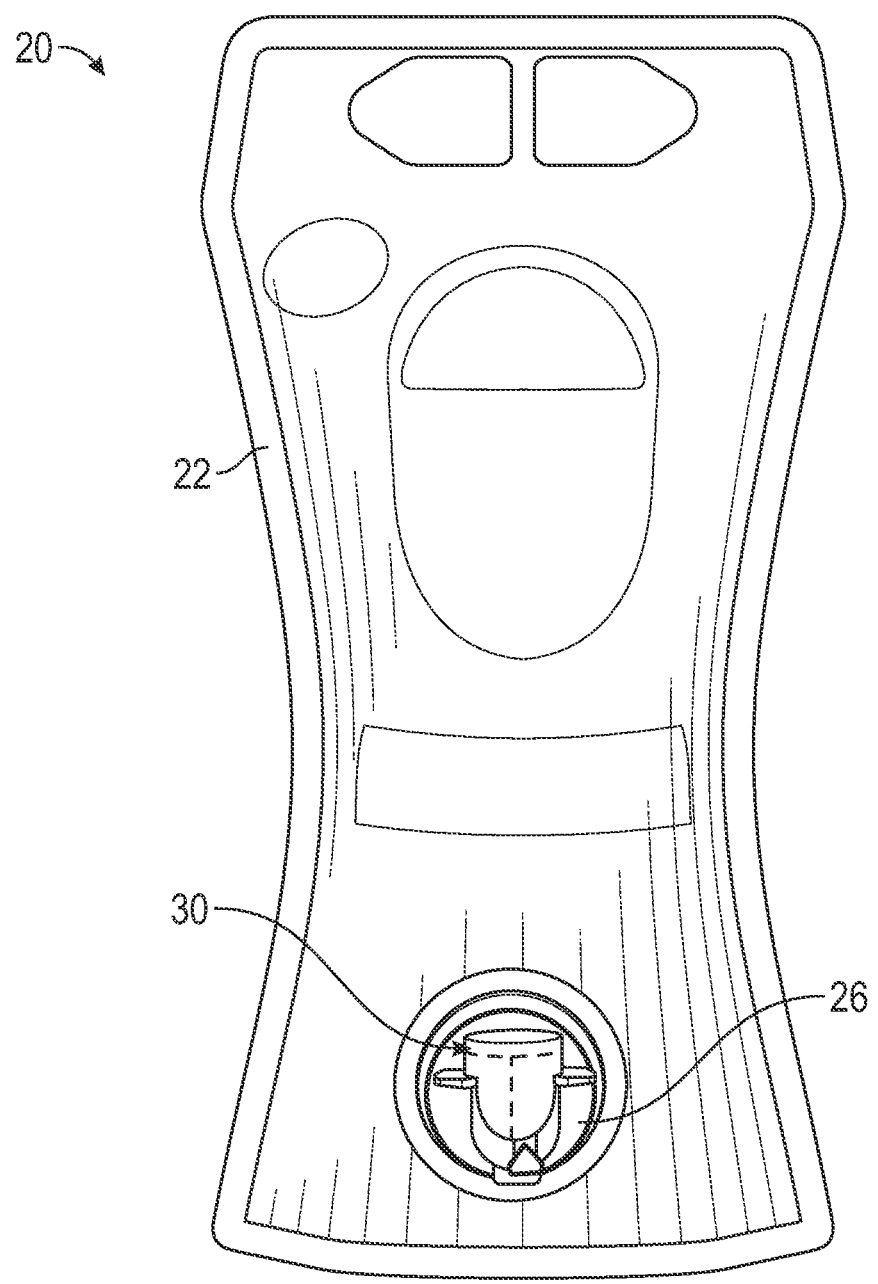
FIG. 1 is a top view of an example of a container assembly configured for use with a high pressure pasteurization ("HPP") process.
Figure 1A:
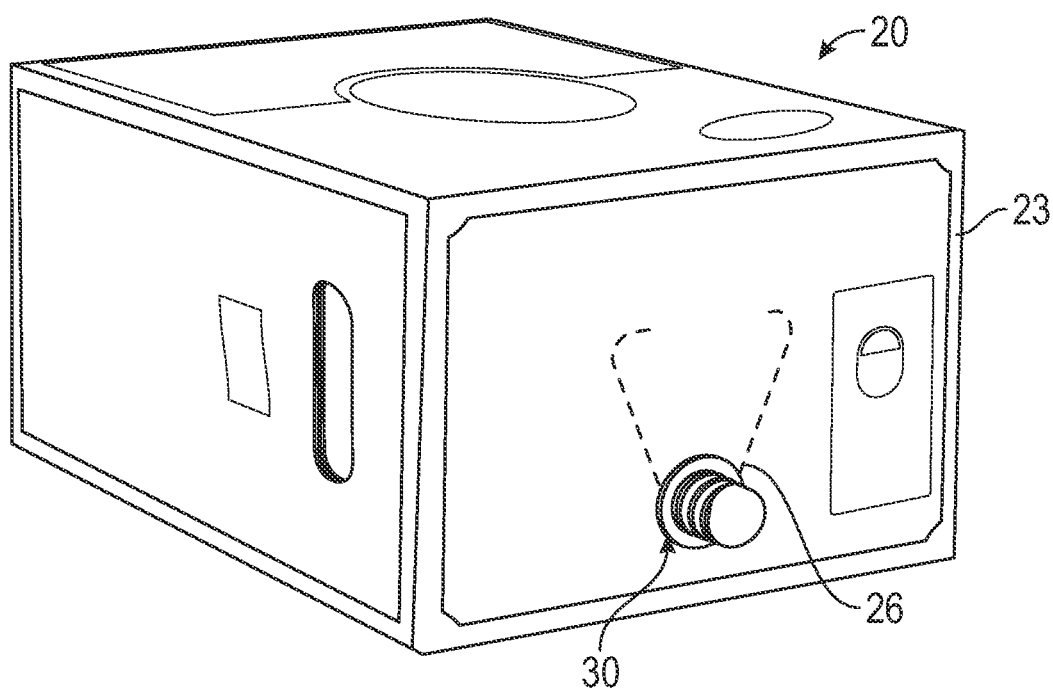
FIG. 1A is a perspective view of a bag-in-box container assembly according to an embodiment.

Referring now to the FIG. 1, an example of a container assembly 20 configured for use in HPP applications is illustrated in more detail. The container assembly 20 includes a flexible container 22 having a hollow internal cavity 24 (see FIG. 2). In the illustrated, non-limiting embodiment, the container 22 is a large, gusseted barrel-style bag formed by fusing together two or more flexible polymer pieces or bags. The illustrated container 22 is intended as an example only. It should be understood that other types of flexible containers 22 formed via any process and having any geometric configuration, such as a bag-in-box (BIB) which includes a flexible container 22 positioned within the cardboard box 23 illustrated in FIG. 1A, doypack, pillow-type container, or barrel bag for example, are within the scope of the disclosure.

A consumable material intended to be pasteurized via an HPP process is stored within the internal cavities of the container 22. Although the container 22 is described as having a hollow internal cavity 24, it should be understood that the container 22 may have a plurality of distinct internal cavities 24. In embodiments where the container 22 includes multiple cavities 24, the consumable material within the cavities 24 may be the same, or alternatively, may be different. Examples of consumable materials include liquids and other beverages, such as syrups, purees, smoothies, pastes, juices, and wine for example. However, other consumable food materials like dressings, sauces, salsas etc. are also within the scope of the disclosure.

The container 22, and therefore the amount of consumable material stored in an internal cavity 24 thereof, may be formed in any of a variety of sizes. In one embodiment, the container 22 is configured to store a single serving of a consumable material, for example between about 88 ml to 591 ml. In another embodiment, the container 22 is configured as a bulk container within which multiple servings are stored. When configured as a bulk container 22, the internal cavity 24 may be configured to store between about one liter and about 18.9 liters of consumable material. However, other sizes exceeding 18.9 liters are considered within the scope of the disclosure. The bulk container may be sized to contain the number of servings commonly consumed within the extended-shelf life of the consumable material therein. For example, if the consumable material within the bulk container has an extended shelf life of about 90 days, the internal cavity 24 may be sized to store the approximate number of servings that would be consumed on average, based on the application, within 90 days. In one embodiment, when intended to provide a large format, the container 22 is configured as a large bag, such as commonly used in conventional bag-in-box products for example.

The container assembly 20 additionally includes a fitment assembly 30 associated with an internal cavity 24 and extending through an opening 26 formed in a portion of the container 22. The fitment assembly 30 is fluidly coupled to the adjacent internal cavity 24 and may allow for quick connection and disconnection with a valve assembly, for example to fill the container 22 with a consumable material, without introducing air into the internal cavity 24. One or more components of the fitment assembly 30 may be selected based on the application of the container 22.

With reference now to FIG. 2, the fitment assembly 30 includes a fitment body, also referred to as a gland, 32 extending between a first end 34 and a second, opposite end 36. Although the gland 32 is illustrated as being generally cylindrical in shape, other shapes are also within the scope of the disclosure. The gland 32 may be formed from a durable material, such as plastic, polyethylene, or polypropylene for example. When the gland 32 is connected to the container 22, the gland 32 is positioned such that a portion thereof is mounted to or sealed against a surface of the container 22, such as an interior surface of the container 22 adjacent the opening 26 for example. As a result, the first end 34 of the gland 32 is disposed within the internal cavity 24 of the container 22, and the second end 36 of the gland 32 extends through the opening 26 and is exposed at an exterior of the container 22. In one embodiment, the portion of the gland 32 fused to the container 22 is an outwardly extending flange 38 arranged generally perpendicular to the axis of the gland 32 and having a diameter larger than the opening 26. One or more additional flanges 40 may extend outwardly from the gland 32, such as at the second end 36 thereof or an intermediate portion of the gland 32.

Figure 3:
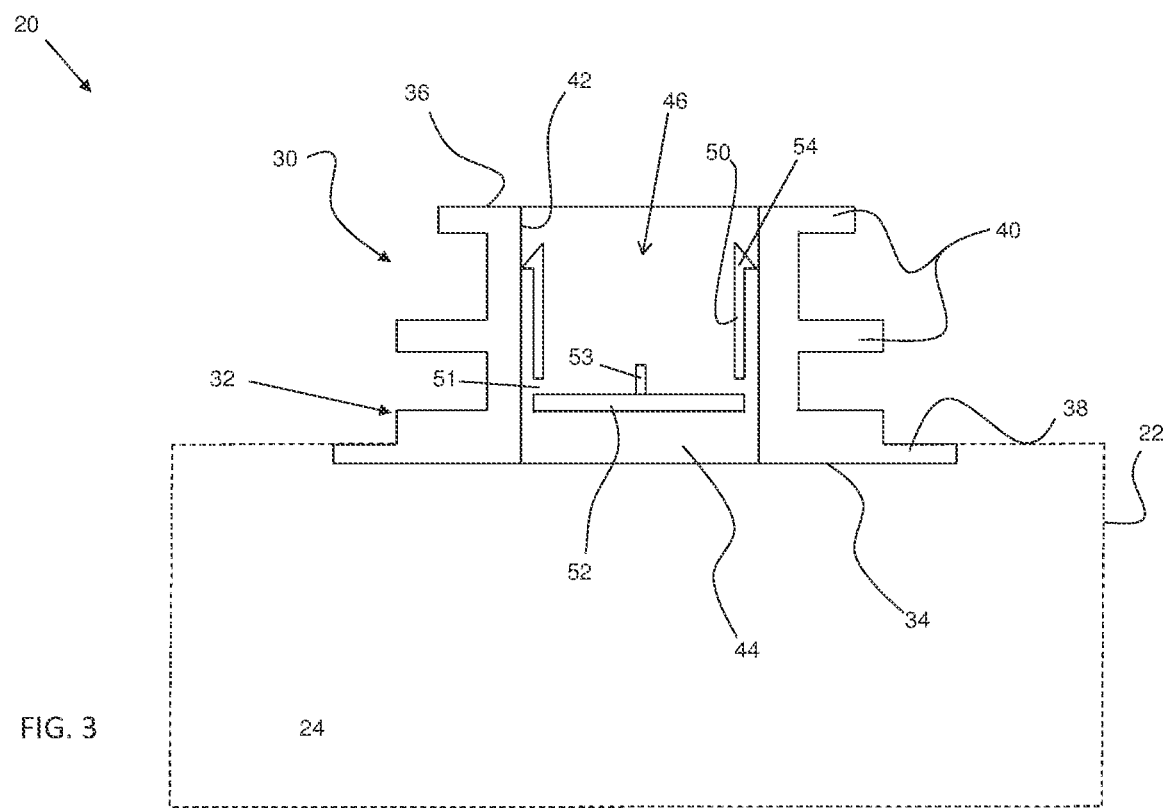
FIG. 3 is a cross-sectional view of a portion of the fitment assembly according to an embodiment.

An inner surface 42 of the gland 32 is configured to define a passageway 44 arranged in fluid communication with the internal cavity 24 of the container 22. With reference now to FIG. 3, the fitment assembly 30 further includes a valve or fitting 46 at least partially received within the passageway 44. The fitting 46 is configured to block or selectively control a flow of consumable material from the interior cavity 24. A variety of different fittings 46 may be associated with the gland 32. In the non-limiting embodiment illustrated in FIG. 3, the fitting 46 includes a sealing membrane insertable into the passageway 44. The sealing membrane has a circumferential sidewall 50 extending parallel to the interior surface 42 and a base 52 arranged at the end of the sidewall 50. As shown, one or more holes 51 are formed in the sidewall 50 and a post 53 extends vertically from the base 52 towards the second end 36 of the gland 32. In one embodiment, a mounting flange 54, complementary to an adjacent contour formed in the interior surface 42 is arranged at an opposite end of the sidewall 50. The mounting flange 54 may be configured to seat and retain the sealing membrane within the passageway 44, and additionally to form a seal isolating a portion of the passageway 44 from fluid communication with the cavity 24. When the sealing membrane is positioned within the passageway 44, the holes 51 formed in the sidewall 50 are positioned adjacent the interior surface 42 and are not arranged in coupled to the interior cavity 24. Although the sealing membrane is illustrated and described as being positioned directly within the passageway 44, in other embodiments, the sealing membrane may be connected to or formed as part of another component, such as a sealing element 70 (FIG. 4) for example.

Another example of a fitting 46 configured for association with the gland 32 is illustrated in FIGS. 6 and 7. In this embodiment, a first end 62 of the fitting body 60 has a diameter complementary to the interior surface 42 of the gland 32 such that the first end 62 is receivable within the passageway 44. The first end 62 may include a coupling mechanism 63, such as a plurality of threads for example, configured to engage a corresponding portion of the surface 42. As shown, the fitting body 60 includes an outwardly extending flange 64 configured to contact and abut the second end 36 of the gland 32 when the fitting 46 is mounted thereto. The fitting body 60 has a passageway (not shown) formed therein and extending between the first end 62 and a second end 66.

A movable element 68 (FIG. 7) is arranged within the passageway to selectively block the flow of the consumable material from the internal cavity 24 there through. As a result, the movable element 68 selectively forms a seal to isolate the passageway of the fitting downstream from the movable element 68 from fluid communication with the internal cavity 24 of the container 20. Application of a force to a mechanism 69 coupled thereto, such as a button or lever for example, moves the movable element 68 to break the seal and allow a flow of consumable material through the entire passageway of the fitting body 60. Although a plunger-type fitting is illustrated, other types of fittings may be used in the container assembly 20. Examples of such fittings include, but are not limited to, the Scholle Flextap®, Scholle FTC™, Scholle 1900™, Conro VPull®, and CPC UDC 9500000 for example. In an embodiment, a fitment assembly 30 including the Conro VPull® fitting 46 is intended for use with a single serving barrel bag, and a fitment assembly 30 including one of the Scholle Flextap®, Scholle FTC™, Scholle 1900™, and CPC UDC 9500000 fitting is intended for use with a bulk container, such as an 18.9 liter bag-in-box for example. However, it should be understood that use of any type of fitting 46 is contemplated with any suitable container 20.

Figure 4:
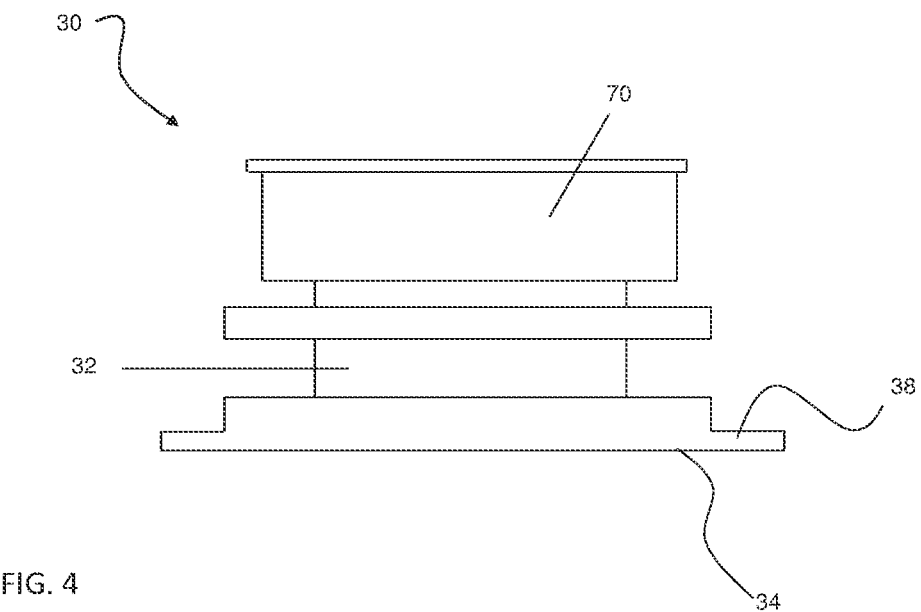
FIG. 4 is a side view of the fitment assembly according to an embodiment.

The fitment assembly 30 additionally includes a sealing element 70 configured to removably couple to a portion of the gland 32 or the fitting 46, as shown in FIGS. 4 and 7, respectively. In one embodiment, illustrated in FIGS. 4 and 5, the sealing element 70 includes a cap formed from a high density polyethylene, or a polypropylene material, such as through an injection molding process for example. In the example shown in FIG. 5, the cap includes a body 72 having a sealed top surface 74 and an inner circumferential flange 76 and an outer circumferential flange 78. The two circumferential flanges 76, 78 are substantially concentric about a central axis of the body 72 and extend downward from the top surface 74. The inner circumferential flange 76 and the outer circumferential flange 78 are separated from one another by a distance to define a channel 80 there between.

The channel 80 is sized to engage and retain a second end 36 of the gland 32 in an interference fit. Receipt of the gland 32 within the channel 80 is configured to form a hermetic seal. In one embodiment, a portion of the valve 46 is also received within the channel 80. At least one of the second end 36 of the gland 32, the valve 46, and the two circumferential flanges 76, 78 includes a structure, such as the mounting flanges 54 for example, configured to facilitate positive engagement of the distal end 36 of the gland 32 within the channel 80.

In another embodiment, illustrated in FIG. 6, the sealing element 70 includes a piece of foil attached, such as via a heat and/or hermetic seal for example, at the second end 66 of the passageway within the fitting 46. The foil similarly forms a hermetic seal at the second end 66 of the fitting 46 which prevents fluid and air from passing into the internal cavity 24.

Figure 8:
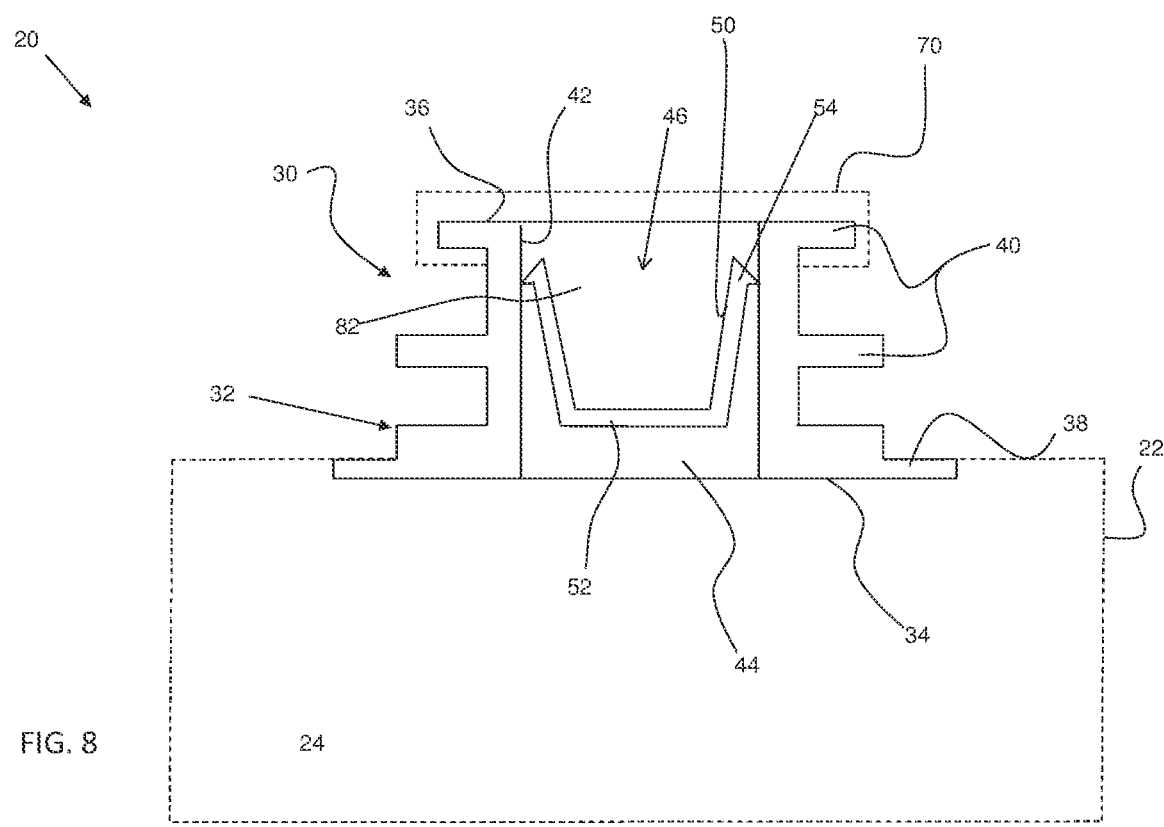
FIG. 8 is a cross-sectional view of the chamber defined within the fitment assembly of FIG. 5 according to an embodiment.

With reference now to FIG. 8, regardless of the configuration of the fitment assembly 30, a chamber 82 is formed between the fitting 46 and the adjacent sealing element 70. The chamber 82 is isolated from the internal cavity 24 of the container 22. In the embodiment illustrated in FIG. 8, the chamber 82 is defined between the sealing membrane within passageway 44 and an adjacent surface of the sealing element 70, which is mounted at the second end 36 of the gland 32. In the embodiment illustrated in FIGS. 6 and 7, the chamber 82 is formed between the sealing element 70 mounted at the second end 66 of the fitting 46 and an adjacent surface of the movable element 68 arranged within the passageway of the fitting 46.

Figure 5:
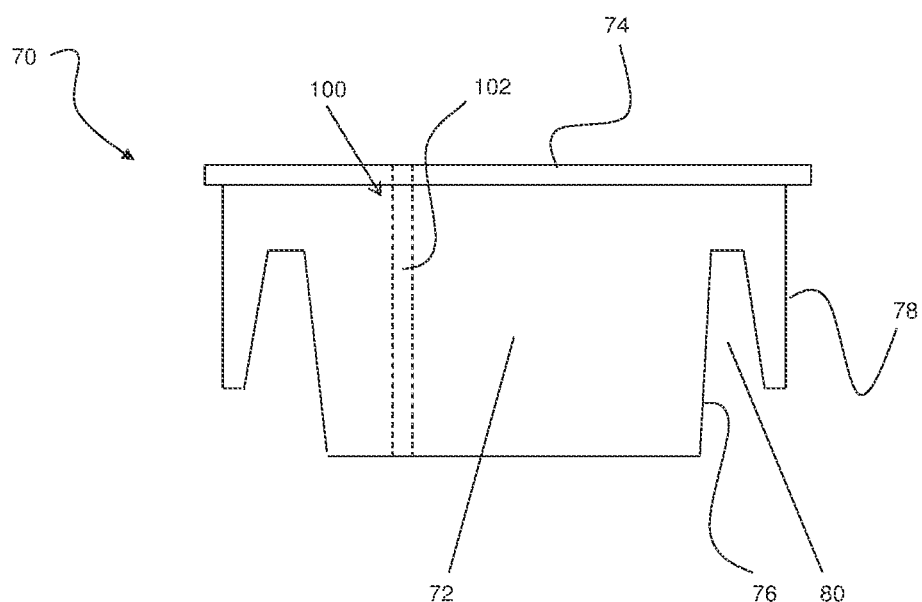
FIG. 5 is a side view of a sealing element of the fitment assembly according to an embodiment.

With reference to FIGS. 5 and 7, a pressure relief mechanism 100 is formed in a portion of the fitment assembly 30 to prevent the formation of a vacuum within the chamber 82 when a high pressure is applied to the container assembly 20, such as during HPP for example. The pressure relief mechanism 100 is arranged in fluid communication with the chamber 82 and is selected so as not to affect the pressurization of the internal cavity 24, thereby ensuring pascalization of the consumable material disposed therein.

As shown in the embodiment of FIG. 5, the pressure relief mechanism 100 may include a small hole 102 extending through the sealing element 70. In other embodiments, such as the embodiment illustrated in FIG. 7, the hole 102 may alternatively be formed in a portion of the fitting 46, downstream from the movable element 68. In one embodiment, the hole 102 has a diameter between about 0.0508 cm and about 0.254 cm, such as about 0.127 cm for example; however, it should be understood that holes of other sizes are also within the scope of the disclosure and that the size of the hole 102 may vary based on each application and the total amount of pressure experienced within the chamber 82.

In addition, other pressure relief mechanisms 100, such as a movable seal configured to deform when a pressure within the chamber 82 exceeds a predetermined value for example, are also within the scope of the present disclosure. For example, the seal formed between the gland 32 and one of the inner circumferential flange 76 and outer circumferential flange 78 of the sealing element 70 may loosen to allow a fluid, such as air for example, to vent from within the chamber 82. In another embodiment, the sealing element 70 functions as a pressure relief mechanism 100. In such embodiments, the sealing element 70 may be formed from a material having a suitable coefficient of expansion such that under pressure the sealing element 70 is configured to elastically deform to increase the size of the chamber 82 and withstand the vacuum produced therein, thereby preventing damage to the fitment assembly 30. Inclusion of any type of pressure relief mechanism 100 enables the use of an existing fitting 46 in HPP.

When a high pressure is applied to a container assembly 20 including a conventional fitment assembly 30, the pressure buildup within the chamber 82 typically causes catastrophic damage to at least one of the gland 32, the fitting 46, and the sealing element 70. Inclusion of a pressure relief mechanism 100, however, prevents the pressure within the chamber 82 from exceeding a threshold and causing damage, such as by allowing pressurized air and/or other fluids within the chamber 82 to vent to ambient for example. As a result, when a high pressure is applied to a container assembly 20 including a pressure relief mechanism 100, such as during HPP, pressure buildup or the formation of a vacuum within the chamber 82 capable of deforming a portion of the gland 32, fitting 46, or sealing element 70 is avoided.

Application of a pressure relief mechanism 100 as described herein to a conventional bag commonly used in a bag-in-box assembly or barrel-bag, transforms the bag into a container assembly 20 suitable for use in HPP. This is an unexpected result since it is generally understood in the industry, based primarily on test results, that these types of bags and fitment assemblies 30 are not compatible for use with HPP.

A method of using a container assembly 20 as described herein includes filling an internal cavity 24 of the container 22 with a desired quantity of a consumable material, such as a beverage for example. A fitting 46 and sealing element 70 are connected to the gland 32 to define a chamber 82 isolated from communication with the consumable material within the internal cavity 24 of the container 22. At least one of the fitting 46 and sealing element 70 contains a pressure relief mechanism 100. The container assembly 20 is then installed within an HPP chamber where a uniform pressure is applied to the container assembly 20 and the consumable material therein at a certain temperature for a specific period of time. When the pressure applied to the container assembly 20 approaches a value known to cause damage to conventional container assemblies 20, a small amount of fluid isolated from the cavity 24, for example air, is vented from the chamber 82 to outside the container assembly 20. As a result, the high pressure within the internal cavity 24 is maintained at a level sufficient to inactivate any microorganisms within the consumable material, and the pressure within the chamber 82 between the sealing element 70 and a portion of the fitting 46 is maintained at a pressure low enough to avoid damage to the fitment assembly 30. After HPP, the sealing element 70 may be removed and/or the fitting 46 may be moved to output consumable material from the internal cavity 24. For example, in the embodiment illustrated in FIG. 3, a coupling (not shown) attached to the vertical post 53 applies a force thereto, causing the sealing membrane to translate within the passageway until the holes 51 are arranged in fluid communication with the internal cavity 24.

Referring now to FIGS. 9-14, examples of a beverage assembly 120 for serving one or more beverages are shown. The beverage assembly 120 includes one or more distribution devices 122, such as taps or fountains for example, operable to provide a perishable beverage therefrom, such as a beverage including a cold-pressed, fresh juice. In the illustrated, non-limiting embodiment of FIG. 9, the assembly 120 includes six distribution devices 122; however, an assembly 120 having any number of distribution devices 122 is contemplated herein. The assembly 120 additionally includes a system 124 for delivering the perishable beverage to a corresponding distribution device 122. The assembly 120 additionally includes wheels 146. It should be understood that in embodiments where the assembly 120 includes a plurality of distribution devices 122, the assembly 120 includes a plurality of systems 124, each of which is configured to provide a distinct beverage to one of the plurality of distribution devices 122.

Figure 10:
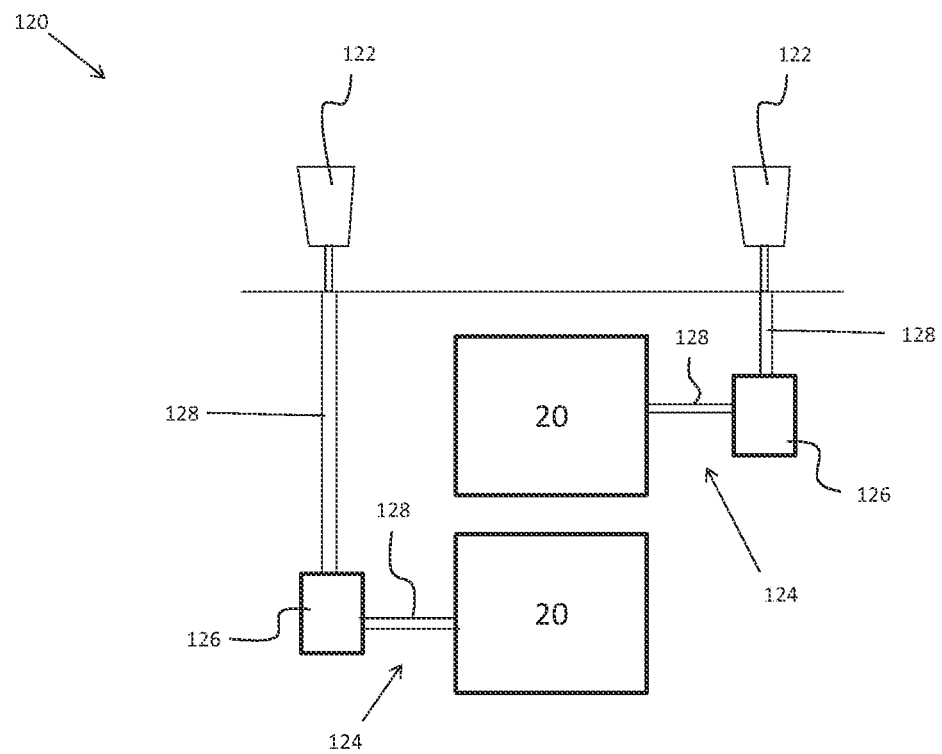
FIG. 10 is a schematic diagram of a beverage assembly for producing a non-diluted beverage according to an embodiment.
Figure 11:
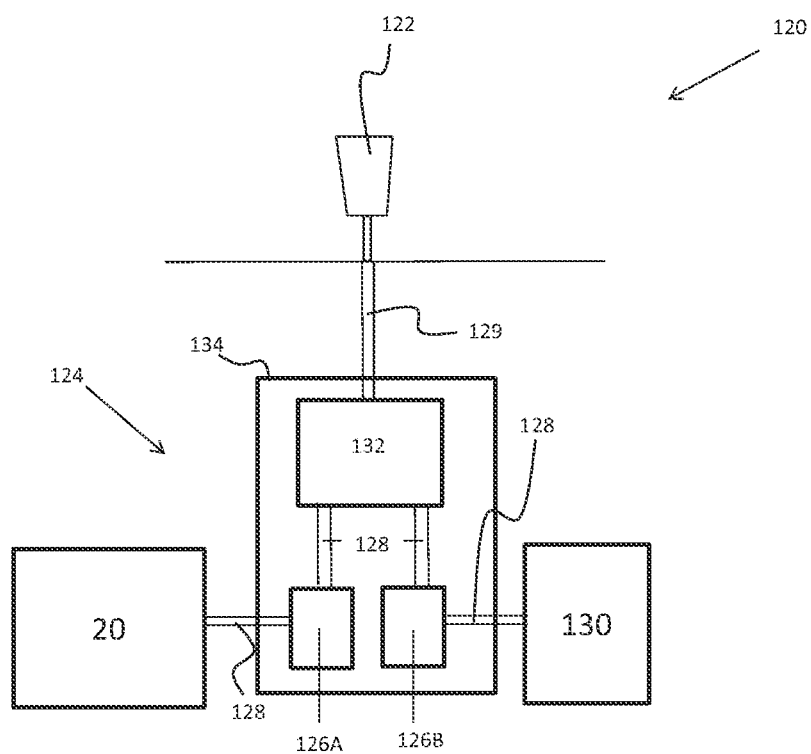
FIG. 11 is a schematic diagram of a beverage assembly for producing a mixed beverage according to an embodiment.

With reference to FIGS. 10 and 11, each system 124 includes a container assembly 20 having an internal cavity 24 containing a plurality of servings of a consumable material. Due to the perishable nature of the contents within the cavity 24, the container assembly 20 is located within a refrigerated area. In an embodiment, the consumable material is a cold pressed HPP juice which has an improved flavor compared to conventional pasteurized juice. Previously, juice or other liquids pascalized via HPP were not available in large format containers, such as 18.9 liter bag-in-boxes (BIB) for example, due to the manufacturing difficulties previously described. However, it should be understood that the pascalized liquid described herein is intended as an example only, and a container assembly 20 containing another consumable material, such as the syrup used for a fountain soda for example, is also within the scope of the disclosure.

In embodiments where the distribution device 122 is configured to output a single, non-diluted consumable material, as shown in FIG. 10, the system 124 additionally includes a pump 126 operably coupled to both the container assembly 20 and the distribution device 122 via one or more fluid conduits 128. The pump 126 may be any type suitable for use with consumable materials, such as a high particulate, diaphragm pump operated by a compressed gas, for example air, nitrogen or carbon dioxide. Actuation of the distribution device 122, such as by rotation thereof about an axis, initiates operation of the pump 126. During operation, the pump 126 draws consumable material from the container assembly 20 and supplies it to the distribution device 122.

With reference now to FIG. 11, in another embodiment, the beverage assembly 120 is configured to output a mixture of two or more consumable materials from a single distribution device 122. Accordingly, in such embodiments the system 124 includes at least one container assembly 20 containing a first consumable material and another container 130 for storing a second consumable material. In an embodiment, the container 130 of the second consumable material is a carboy. In embodiments where the distribution device 122 is configured to output a pre-mixed alcoholic beverage, then another container 130 may include a desired type of alcohol, such as tequila for example, and the container assembly 20 may include a mixer complementary to the alcohol, such as lime juice for example. In an embodiment, the mixer includes a consumable material that has been pascalized via HPP, such as a cold-pressed Ripe® or a Craft Bar Juice® for example. Although the system 124 is described as having a first consumable material and a second consumable material, a system 124 having more than two consumable materials is also considered within the scope of the disclosure.

Figure 11A:
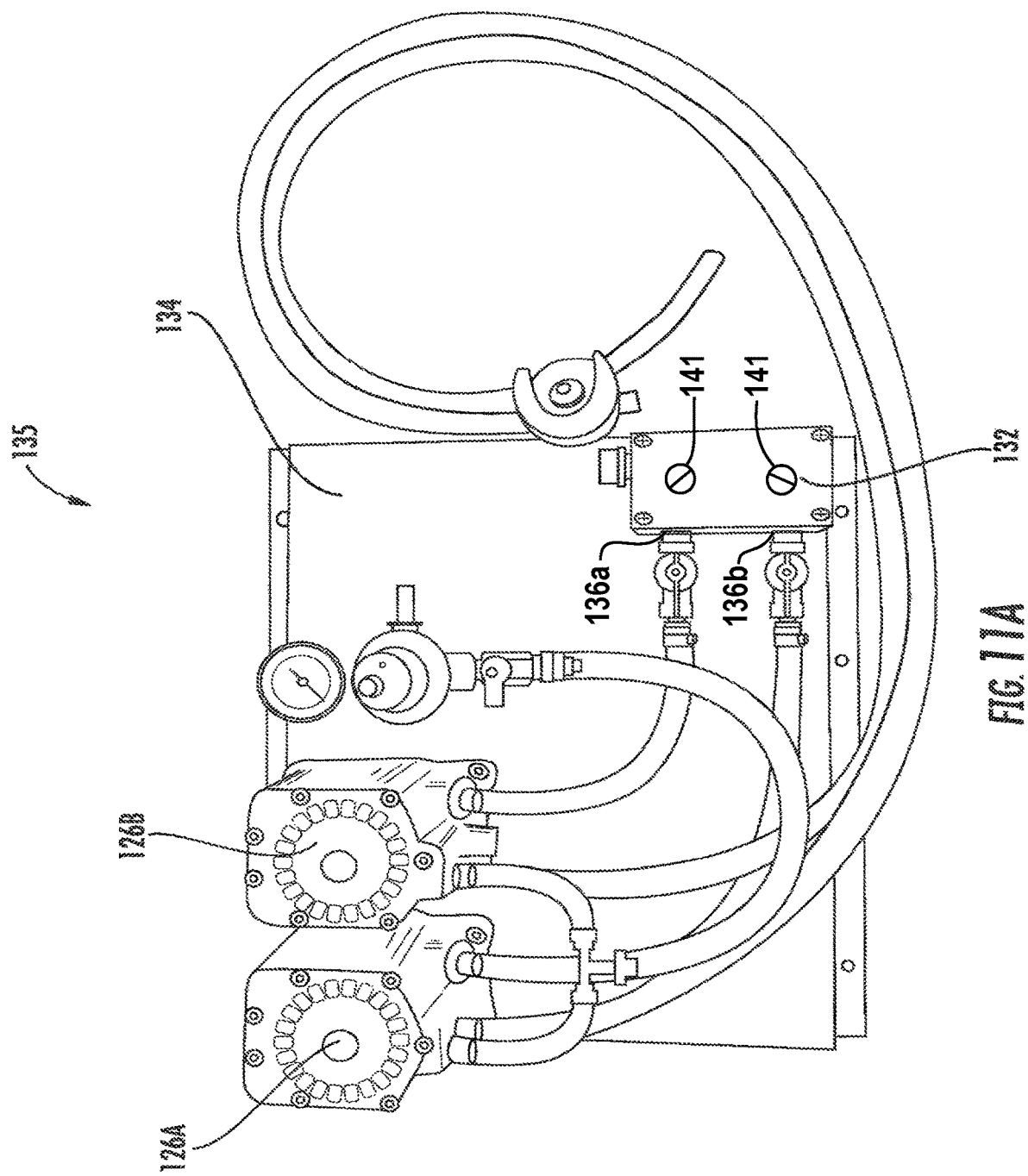
FIG. 11A is a front view of a pump panel of a beverage assembly for producing a mixed beverage according to an embodiment.

The system 124 includes a pump 126 associated with each consumable material of the beverage to be output from a distribution device 122. As shown in the FIGS. 11 and 11A, the system 124 includes a first pump 126a associated with the container assembly 20 via a fluid conduit 128 and a second pump 126b associated with the container 130 via a fluid conduit 128. In an embodiment, the container assembly 20 and the container 130 are outfitted with fitment assemblies 30 including "quick connect" fittings complementary to "quick connect" fittings mounted at an end of each corresponding fluid conduit 128. The coupling formed by the interface of these "quick connect" fittings allows a user to easily and quickly interrupt or recreate the fluid connection between the containers 20, 130 and the pumps 126, for example when replacing either the container assembly 20 or the container 130.

The system 124 may additionally include a mixing block 132 configured to mix the first consumable material and the second consumable material before supplying the mixture to the distribution device 122. In an embodiment, best shown in FIG. 11A, the plurality of pumps 126 and the mixing block 132 are physically mounted to a support structure 134 to form a "pump panel" 135. The pump panel 135 is intended to support a portion of the components of a single system 124. However, it should be understood that a pump panel 135 for supporting the components of any number of systems 124 is contemplated herein. Further, in embodiments where multiple systems 124 are mounted to a pump panel 135, the plurality of systems 124 may have the same, or different, configurations.

Figure 12:
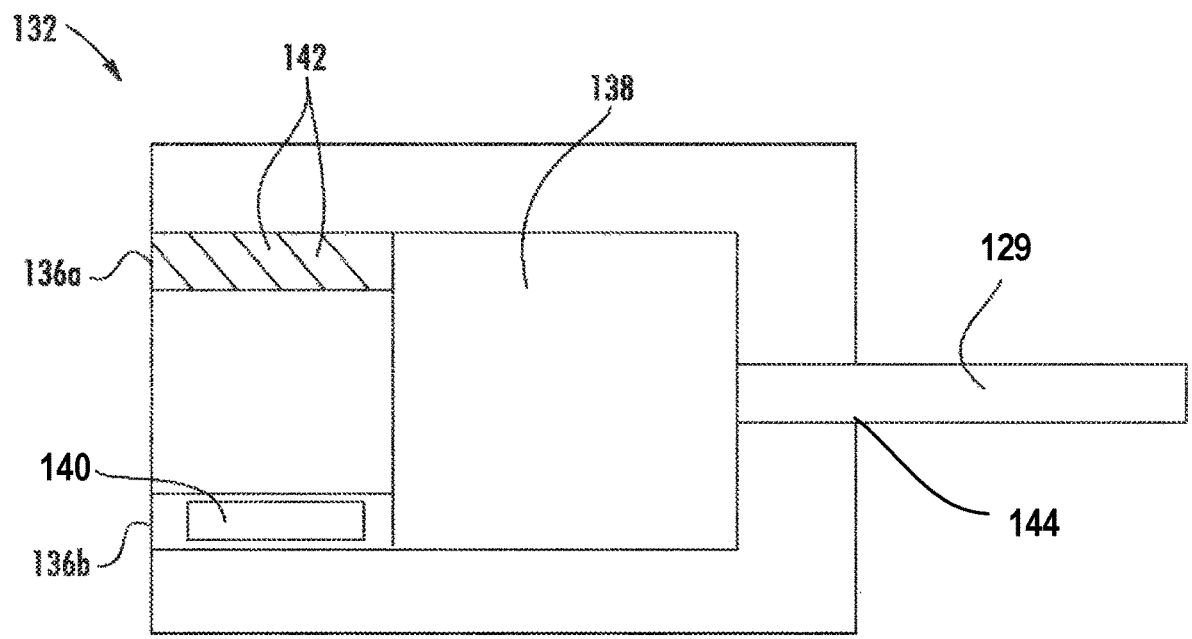
FIG. 12 is a schematic cross-sectional view of a mixing block of the system of FIG. 11 according to an embodiment.

With reference now to FIG. 12, a schematic diagram of an example of the mixing block 132 is illustrated in more detail. The mixing block 132 is configured to receive a flow of both the first consumable material from the container assembly 20 and the second consumable material from the container 130. Operation of the first pump 126a is configured to supply the first consumable material from the container assembly 20 to a first inlet 136a of the mixing block 132 via one or more fluid conduits 128. Similarly, operation of the second pump 126b is configured to provide the second consumable material from the container 130 to a second inlet 136b of the mixing block 132 via one or more fluid conduits 128. From the inlets 136a, 136b, the first and second consumable materials are supplied to an internal cavity 138 where they are mixed before being supplied, such as via an outlet 144 to another fluid conduit 129 (FIG. 11) for example, to the distribution device 122.

The mixing block 132 is operable to regulate the amount of one or more of the consumable materials provided thereto. In one embodiment, the mixing block 132 includes a flow regulation device, such as a set screw 141 (FIG. 11A) for example, arranged adjacent an inlet 136a, 136b for receiving at least one of the first consumable material and the second consumable material. The flow regulation device 140 is adjustable to increase or decrease the flow rate, and therefore the amount of a consumable material provided to the internal cavity 138 of the mixing block 132. In another embodiment, a flow regulation device 140 may be positioned adjacent each inlet 136a, 136b to provide independent control of the flow rate associated with each of the plurality of consumable materials provided thereto. In embodiments where the first consumable material within the container assembly 20 is a mixer and the second consumable material within the other container 130 is a corresponding alcohol, the at least one flow regulation device 140 may be adjusted to achieve a desired strength or flavor of the mixed beverage output by the distribution device 122. More specifically, the one or more flow regulation devices 140 may be used to control the ratio of the plurality of consumable materials within the cavity 138 of the mixing block 132 and expelled from the distribution device 122.

In an embodiment, a portion of the mixing block 132, such as one of the inlets 136 or the internal cavity 138 thereof, includes one or more turbulence-inducing features 142, such as porting, ribs, or any other features suitable to affect the flow of a consumable material into the mixing block 132. Alternatively, or in addition, a portion of one or all of the inlets 136 of to the mixing block 132 may have a reduced cross-sectional area such that a venturi-like pressure drop is created within the mixing block 132.

Figure 9:
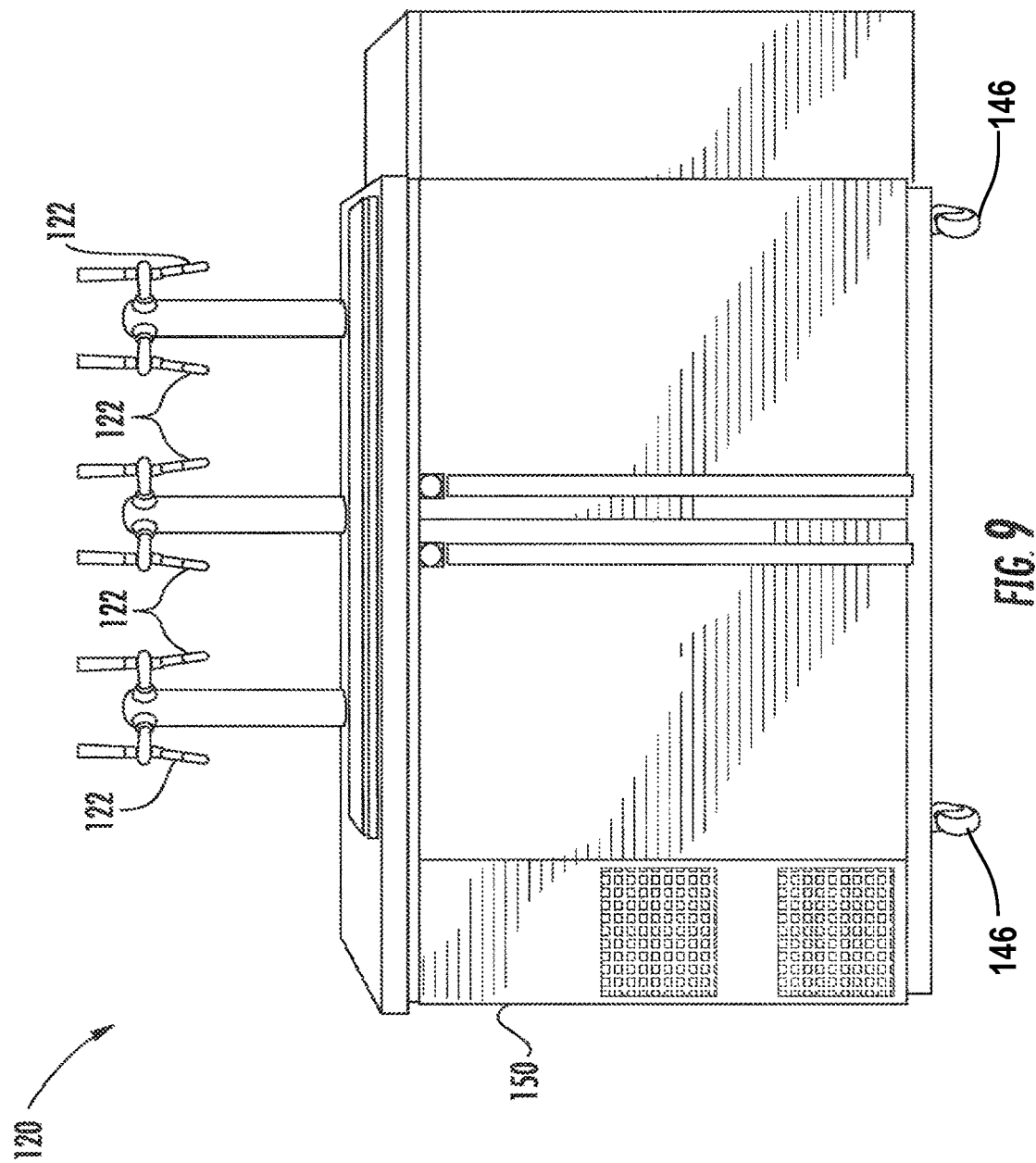
FIG. 9 is a front view of a beverage assembly according to an embodiment.
Figure 13:
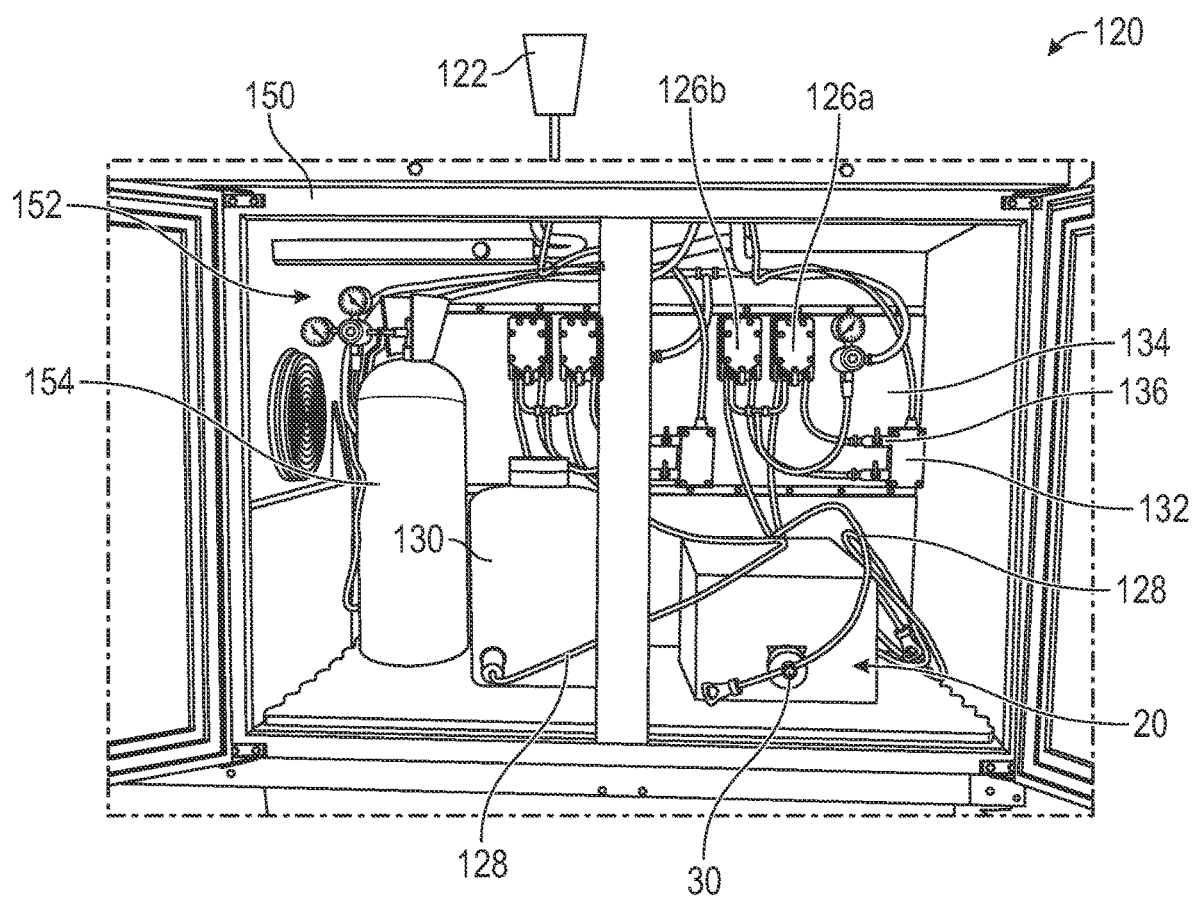
FIG. 13 is a front view of beverage assembly having a "local" configuration according to an embodiment.
Figure 14:
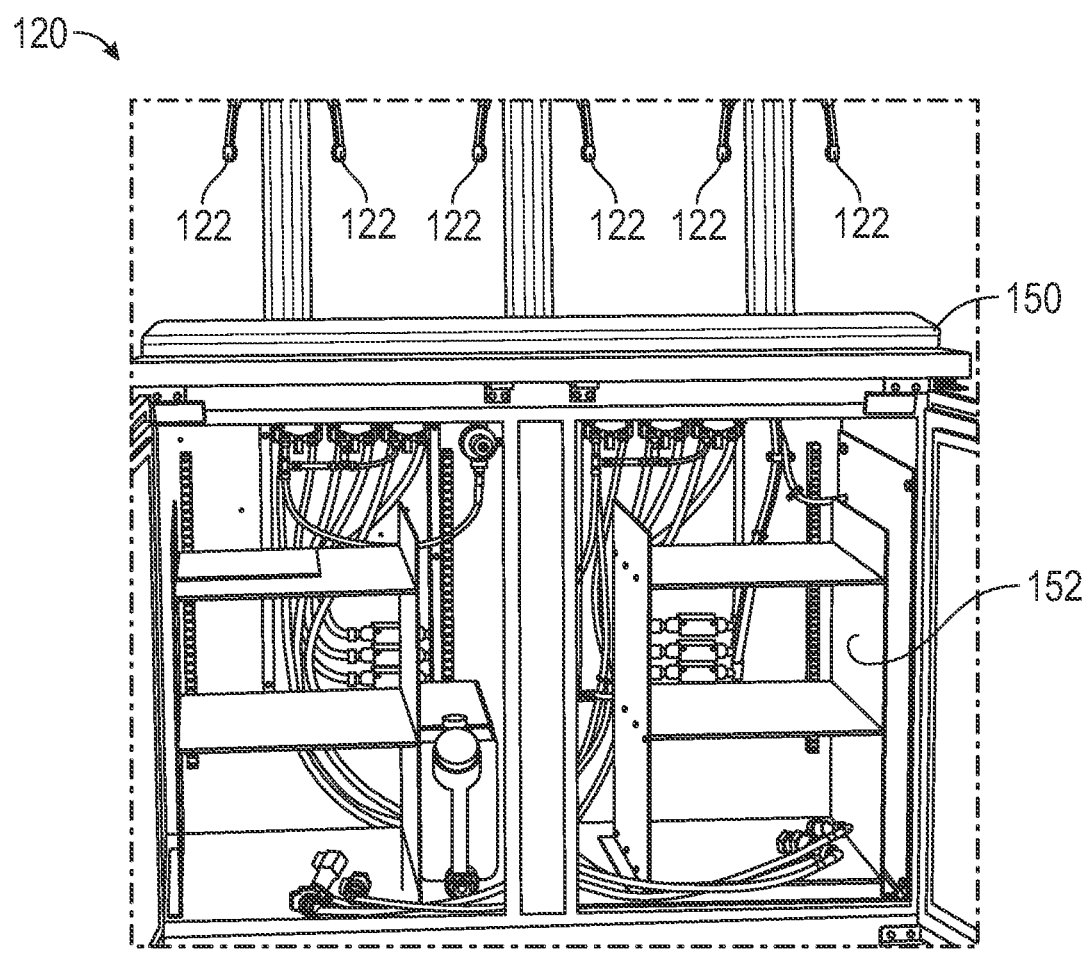
FIG. 14 is a front view of a portion of the beverage assembly of FIG. 9 having a "local" configuration according to an embodiment.

The beverage assembly 120 may have either a "local" or "long run" configuration. When the beverage assembly 120 has a "local" configuration, the assembly includes a self-contained unit 150, as shown in FIGS. 9, 13, and 14. In such embodiments, the unit 150 includes at least one refrigerated cavity 152 and the distribution device 122 is mounted directly or indirectly to an exterior of the unit 150. Each system 124 of the assembly 120, including the container assembly 20, the container 130, and pump panel 135, is mounted within the interior of the refrigerated cavity 152. The source of compressed gas 154 associated with the one or more pumps 126 of each system 124 may also be located within the refrigerated cavity 152, as shown in FIG. 13, or alternatively, may be positioned elsewhere, such as within a non-refrigerated cavity (not shown) of the unit 150, or separate from the unit 150, as shown in FIG. 14. It should be understood that the beverage assembly 120 may be formed via modification of any residential or commercial tap system, such as a kegerator or fountain tap system for example.

Figure 15:
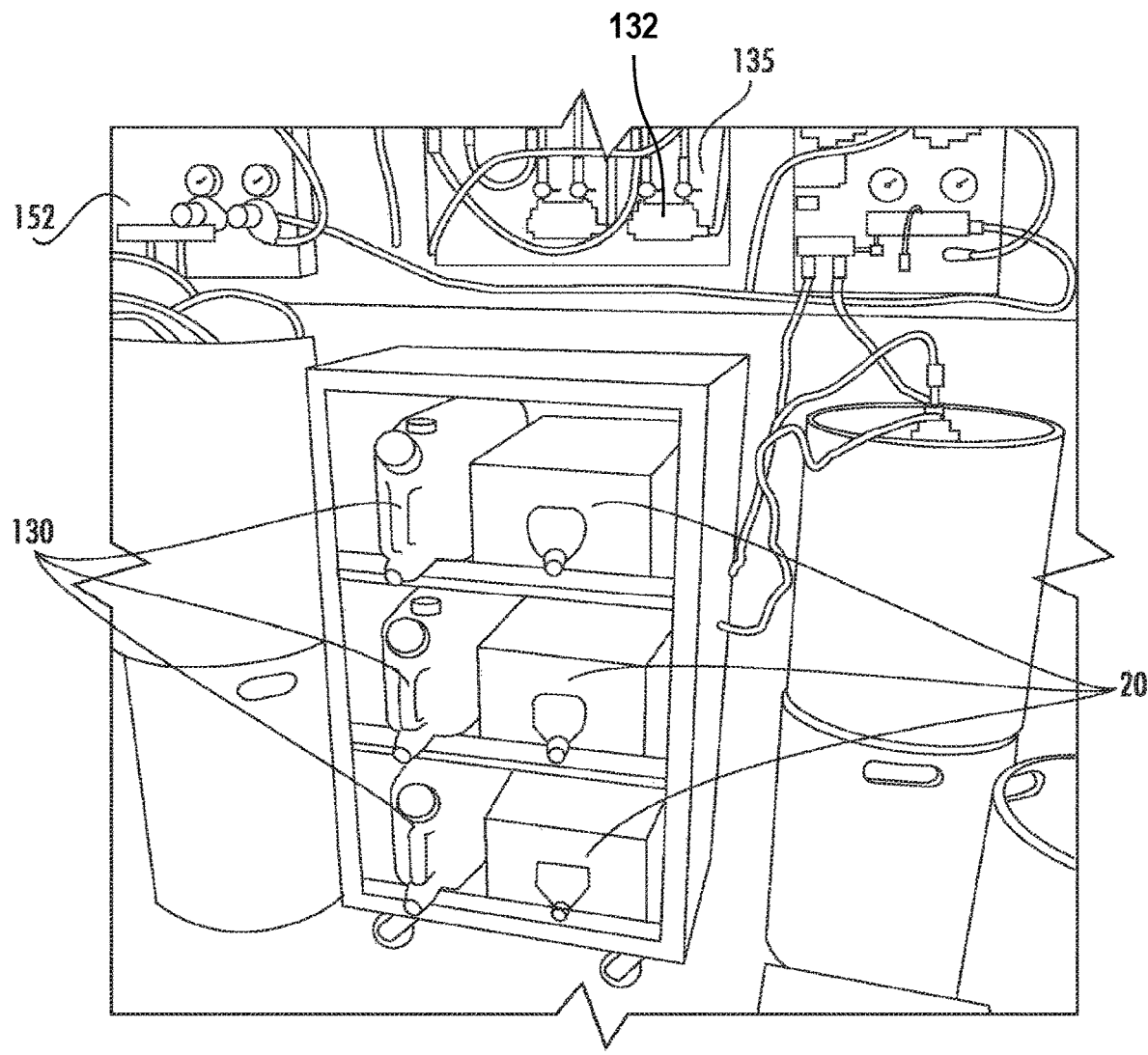
FIG. 15 is a front view of a portion of a beverage assembly having a "long run" configuration according to an embodiment.
Figure 16:
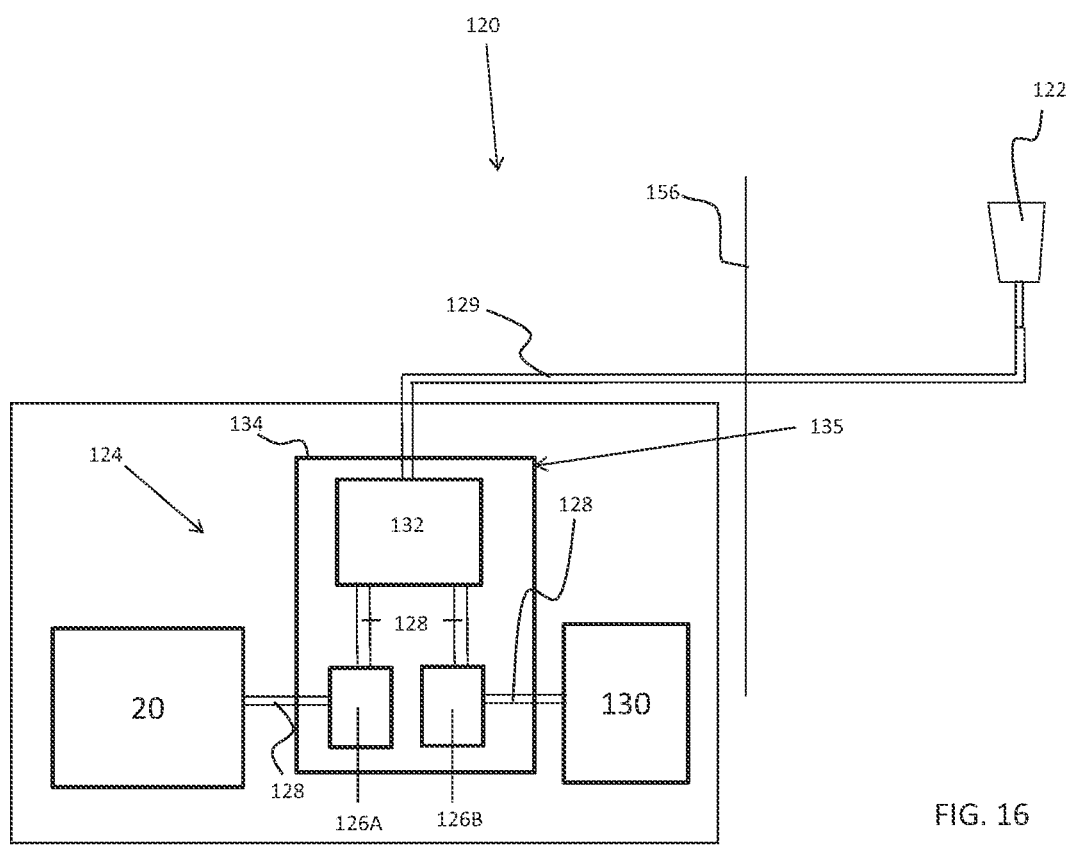
FIG. 16 is a schematic diagram of a beverage assembly having a "long run" configuration according to an embodiment.

Alternatively, when the beverage assembly 120 has a "long run" configuration, as shown in FIGS. 15 and 16, at least a portion of the system 124 is positioned within a refrigerated cavity 152, such as within a walk-in cooler in the storage area of a restaurant for example, arranged at a different location than the distribution device 122. As a result, one or more conduits 128, 129 of the system 124 may extend through walls, cabinets, or other components illustrated schematically at 156. In such embodiments, the container assembly 20, the container 130, and the pump panel 135 including the pumps 126a, 126b, and the mixing block 132 may be mounted within the refrigerated cavity 152, as shown in FIG. 15. However, embodiments where the pump panel 135 is mounted adjacent the distribution device 122, or at a position between the refrigerated cavity 152 and the distribution device 122 are also contemplated herein. In addition, the source of compressed gas 154 associated with the one or more pumps 126 may be located within the refrigerated cavity 152, adjacent the distribution device 122, or at any suitable position there between.

Conventional beverage systems configured to dispense a mixture of two or more consumable beverages draw a premade mixture from a single source or container. The source containing the mixture is pressurized, typically with carbon dioxide, such that as the mixture is dispensed, the mixture becomes carbonated. The beverage assembly 120 illustrated and described herein, however, automatically draws the ingredients from separate containers 20, 130 and mixes the ingredients in real time in response to operation of the distribution devices 122. Further, because a compressed gas is applied to operate the pump(s) 126 of the system 124 and not to the consumable materials themselves, the mixture output from the distribution device 122 is not carbonated by the compressed gas, and therefore has an improved taste.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system comprising:
   a) a first reservoir container adapted to contain a first perishable consumable material;
   b) a second reservoir container adapted to contain a second consumable material;
   c) a mixing block comprising:
      i) a first inlet;
      ii) a second inlet;
      iii) an outlet;
      iv) a flow regulation device integral to said mixing block and in line with said second inlet wherein said flow regulation device is adjustable to increase or decrease a flow rate through said second inlet; and
      v) an internal cavity in fluid communication with said first inlet, said flow regulation device, and said outlet wherein said internal cavity is configured to:
         1) receive said first perishable consumable material from said first inlet;
         2) receive said second consumable material from said flow regulation device;

3) mix said first perishable consumable material and said second consumable material to provide a pre-mixed beverage; and
4) provide said pre-mixed beverage to said outlet;
d) a first pump operably coupled to said first reservoir container to provide said first perishable consumable material from said first reservoir container to said first inlet of said mixing block;
e) a second pump operably coupled to said second reservoir container to provide said second consumable material from said second reservoir container to said second inlet of said mixing block;
f) a distribution device in fluid communication with said outlet of said mixing block, said distribution device adapted to be opened and closed;

wherein:

g) said first reservoir container is contained within a refrigerated cavity; and
h) said first pump and said second pump are each operably coupled to the distribution device and operable to pump said first perishable consumable material and said second consumable material simultaneously in response to said distribution device being opened.

2. A system comprising:
a) a first reservoir container adapted to contain a first perishable consumable material;
b) a second reservoir container adapted to contain a second consumable material;
c) a mixing block comprising:
  i) a first inlet;
  ii) a second inlet;
  iii) an outlet;
  iv) a flow regulation device in line with said second inlet wherein said flow regulation device is adjustable to increase or decrease a flow rate through said second inlet; and
  v) an internal cavity in fluid communication with said first inlet, said flow regulation device, and said outlet wherein said internal cavity is configured to:
    1) receive said first perishable consumable material from said first inlet;
    2) receive said second consumable material from said flow regulation device;
    3) mix said first perishable consumable material and said second consumable material to provide a pre-mixed beverage; and
    4) provide said pre-mixed beverage to said outlet;
d) a first pump operably coupled to said first reservoir container to provide said first perishable consumable material from said first reservoir container to said first inlet of said mixing block;
e) a second pump operably coupled to said second reservoir container to provide said second consumable material from said second reservoir container to said second inlet of said mixing block;

wherein:

f) said first reservoir container is contained within a refrigerated cavity; and
g) said flow regulation device is a set screw integral to said mixing block.

3. The system of claim 2 wherein:
a) said system comprises said first perishable consumable material;
b) said first perishable consumable material comprises particulates; and
c) said first pump is a diaphragm pump adapted to pump high particulate materials.

4. The system of claim 3 wherein said first perishable consumable material comprises one or more of a puree, a smoothie, a paste, or a salsa.

5. The system of claim 2 wherein said distribution device is a tap.

6. The system of claim 2, wherein said second reservoir container, said first pump, said second pump, and said mixing block are all mounted within said refrigerated cavity.

7. The system according to claim 6 which further comprises wheels on a bottom thereof.

8. The system according to claim 2 wherein said first reservoir container is a bag-in-box suitable for high pressure pascalization.

9. The system according to claim 2 wherein said second reservoir container is a carboy suitable for holding an alcoholic beverage.

* * * * *